United States Patent [19]
Gervae

[11] Patent Number: 6,138,400
[45] Date of Patent: Oct. 31, 2000

[54] SUBMERSIBLE BAIT DISPENSER

[76] Inventor: Todd A. Gervae, 150 Maple Ridge Rd., Negaunee, Mich. 49866

[21] Appl. No.: 09/306,714

[22] Filed: May 7, 1999

[51] Int. Cl.$^7$ ..................................................... A01K 97/02
[52] U.S. Cl. ........................................................... 43/44.99
[58] Field of Search ........................ 43/44.99; 119/51.04, 119/212, 230, 242, 52.14, 52.15, 53, 5, 54

[56] References Cited

U.S. PATENT DOCUMENTS

| | | |
|---|---|---|
| D. 244,372 | 5/1977 | Kirkhart . |
| 1,497,199 | 6/1924 | Sutthoff .................................. 43/44.99 |
| 1,595,758 | 8/1926 | Collins ....................................... 119/54 |
| 2,857,705 | 10/1958 | Woodcock . |
| 2,928,202 | 3/1960 | Smerke ................................... 43/44.99 |
| 2,941,327 | 6/1960 | Rundell ................................... 43/44.99 |
| 2,948,986 | 8/1960 | Williamson . |
| 3,083,492 | 4/1963 | Kling ....................................... 43/44.99 |
| 3,163,959 | 1/1965 | Hollar ..................................... 43/44.99 |
| 3,611,613 | 10/1971 | Perches ................................... 43/44.99 |
| 3,964,204 | 6/1976 | McKinley . |
| 4,024,669 | 5/1977 | Fotis ....................................... 43/44.99 |
| 4,047,320 | 9/1977 | Lee . |
| 4,065,870 | 1/1978 | Muko ...................................... 43/44.99 |
| 4,143,479 | 3/1979 | Kingston . |
| 4,226,338 | 10/1980 | Schweim . |
| 4,428,146 | 1/1984 | Walker . |
| 4,603,502 | 8/1986 | MacDonald ............................ 43/44.99 |
| 5,033,227 | 7/1991 | Cixwell ................................... 43/44.99 |
| 5,842,303 | 12/1998 | Abraham et al. . |
| 5,913,672 | 6/1999 | Nicholson .............................. 43/44.99 |

FOREIGN PATENT DOCUMENTS

| | | |
|---|---|---|
| 1488709 | 7/1967 | France . |
| 1520691 | 8/1978 | United Kingdom ................ 119/51.14 |

*Primary Examiner*—Kurt Rowan
*Attorney, Agent, or Firm*—Richard C. Litman

[57] ABSTRACT

A submersible bait dispenser provides for the release of "chum" or free bait, at a predetermined depth in the water in the vicinity of the baited hook or lure being used by an angler. The dispenser generally comprises a container with a selectively openable door or panel, connected to a line. A deformable catch secures the door or panel in the closed position until opening is desired. The same line used for lowering the dispenser in the water, is also used for opening the panel as desired. The present dispenser is filled with "chum" (either live or killed bait, as desired) and lowered in the water to a predetermined depth, at approximately the same depth as the baited hook or lure being used by the angler; the device may be lowered to rest upon the bottom of the body of water, if so desired. Upon reaching the desired depth, the line is given a sharp tug, which releases the deformable catch and opens the door or panel, thereby releasing the "chum" in the vicinity of the baited hook or lure, where it will serve to attract fish to the vicinity of the baited hook or lure. The device may then be retrieved using the remote lowering and release line, for reuse as desired. The present submersible bait dispenser may include some form of ballast weight therein, as desired, and is preferably formed of non-corrosive materials which are also resistant to freezing, for ease of use in ice fishing.

18 Claims, 3 Drawing Sheets

SUBMERSIBLE BAIT DISPENSER

BACKGROUND OF THE INVENTION

1. Field of the Invention

The present invention relates generally to means for attracting fish and game, and more specifically to a dispenser for "chum," or bait which is distributed in an area adjacent a baited hook or lure, for attracting fish thereto. The present dispenser is submersible, and is lowered to the general level of the baited hook or lure to distribute the "chum" at the approximate level of the baited hook or lure, rather than merely distributing the chum on the surface for a hook or lure positioned well below the surface.

2. Description of the Related Art

The use of bait and lures for attracting fish (and other game) has been known for generations. In fishing, the concept of attracting fish to the general area where an angler is using a baited hook or lure by means of distributing additional bait in the water, has been known for quite some time, and in fact is referred to by the term "chumming." The freely distributed bait serves to attract more fish from a greater distance, than a single piece of bait on a hook, and thus the technique finds some favor with anglers where the technique is of value (i.e., stationary fishing, as opposed to trolling).

Typically, the free bait or "chum" is merely scattered atop the surface of the water by hand, and either floats or sinks slowly. However, in stationary fishing, the baited hook or lure is almost always lowered to some depth below the surface of the water, or perhaps to the bottom of the body of water. It will be seen that the provision of "chum" on the surface will likely have little bearing upon the attraction of fish to a lure which is located at some depth below the surface. In fact, where tidal, river, or other currents exist, the "chum" will almost certainly drift away from the area of the baited hook or lure before descending to that depth (if such occurs at all), thus actually drawing any fish in the area, away from the baited hook or lure, rather than drawing fish to the hook.

Accordingly, a need will be seen for a bait dispenser which is submersible, and which may be lowered to the general depth (i. e., on the bottom of a body of water, or at some intermediate depth) of a baited hook or lure. The dispenser may then be opened by means of a line attached thereto, to release the "chum" (live minnows, or possibly pieces of bait, etc.) for attracting fish to the vicinity of the lure. The submersible bait dispenser is recovered after release of the "chum" by means of the attached line, for later use.

A discussion of the related art of which the present inventor is aware, and its differences and distinctions from the present invention, is provided below.

U.S. Pat. No. 2,857,705 issued on Oct. 28, 1958 to John Woodcock, titled "Bait Dispenser," describes a generally conical cap for a bait container, with the tip of the cone having an opening with a spring loaded slotted cover. The opening is just large enough to allow one bait article (cricket, etc.) at a time to escape therefrom when the cover is lifted. When the cover is lifted, the bait insect or the like attempts to escape therefrom, thus being positioned for the insertion of a hook therethrough by means of the slot in the cover. The Woodcock device is adapted for allowing a person to bait a hook with live bait, and cannot provide for the remote distribution of plural bait articles at a predetermined depth below the surface of the water, as provided by the present submersible bait dispenser.

U.S. Pat. No. 2,948,986 issued on Aug. 16, 1960 to Carl S. Williamson, titled "Bait Holder And Dispenser," describes a box having a series of openable closures with padded tongs or tweezers normally placed therein. Bait insects or the like are placed within the box, with means being provided to guide the bait toward the openable closures and the tongs therein. When an insect is needed, the tongs are used to grip one which has climbed to that area of the container, with the tong receptacle automatically closing when the tongs are withdrawn therefrom. No means is provided by Williamson for simultaneously dispensing multiple bait organisms, nor for remotely dispensing such organisms below the surface of the water, as in the "chumming" apparatus of the present invention.

U.S. Pat. No. 3,964,204 issued on Jun. 22, 1976 to Francis W. McKinley, titled "Container and Dispenser For Fish Bait," describes a device having one or more rotary hooked or cupped fingers therein, which cooperate with slotted openings in the upper surface of the container. The fingers are rotated and pick up bait organisms within the container (grubs, insects, etc., depending upon the configuration of the fingers) and draw them upwardly through corresponding slotted openings where they are accessible for baiting a fish hook. No means is provided in the McKinley device for simultaneously releasing a plurality of bait organisms, nor for remotely releasing such organisms below the surface of the water, as provided by the present submersible bait dispenser.

U.S. Pat. No. 4,047,320 issued on Sep. 13, 1977 to Marion D. Lee, titled "Bait Dispenser," describes a generally tubular device having a slotted opening or passage in the neck thereof. The neck may be selectively spread to widen the slot for the passage of bait insects or the like therefrom. A spring loaded plunger is positioned in the neck below the slot, to block the passage of more than one insect at a time through the neck of the device. The Lee device is adapted for providing single bait insects for the baiting of a fishing hook, rather than for the remote and simultaneous distribution of a plurality of bait organisms below the surface of the water for "chumming," as provided by the present submersible bait dispenser.

U.S. Pat. No. 4,143,479 issued on Mar. 13, 1979 to William Kingston, titled "Fish Bait Dispenser," describes a remotely actuated device for opening a prepackaged container of bait. A vacuum packaged container is placed within a frame, with a spring biased blade positioned at one edge of the container. Fine wires of dissimilar metals are used to hold the blade away from the container. When the device is placed in a liquid which may serve as an electrolyte (e. g., sea water), the metals corrode, thus releasing the blade to cut the package open. The device is thus not operable in fresh water, and the timing is imprecise due to the release mechanism provided. Also, the Kingston device cannot be used with live bait, due to the sealed nature of the package with which the device is used. In contrast, the present bait dispenser is remotely but manually actuated as desired, and provides for the release of live or other "chum" bait at a time, location, and depth as desired by the angler, in either fresh or salt water.

U.S. Pat. No. 4,226,338 issued on Oct. 7, 1980 to Donald E. Schweim, titled "Live Bait Dispenser," describes a relatively large and bulky, automated vending machine for dispensing bait to purchasers thereof. The Schweim machine is adapted for fixed installation at a given location and cannot be immersed in water for operation, nor can it be remotely operated by a line attached thereto for releasing bait therefrom, as provided by the present submersible bait dispenser.

U.S. Pat. No. 4,428,146 issued on Jan. 31, 1984 to Wilbert L. Walker, titled "Fish Bait Dispenser," describes a container having a narrow bottom portion for guiding generally spherical fish bait portions to a slotted outlet. A fish hook is passed into the slotted outlet, to hook one of the fish bait articles. The Walker device is adapted for assisting an angler in baiting a hook, and is thus more closely related to the devices disclosed in the U.S. patents to Woodcock, McKinley, and Lee, discussed further above, than to the present invention. No means of remotely and simultaneously releasing a plurality of bait articles or organisms below the surface of the water is disclosed by Walker, as provided by the present submersible bait dispenser.

U.S. Pat. No. 5,842,303 issued on Dec. 1, 1998 to George Abraham et al., titled "Fishing Bait Dispenser," describes an automated dispensing device for attachment to the side of a boat, above the water. An electrically driven conveyor belt picks up bait from a container and raises it to the top of the device, where it is dispensed over the side of the boat to the surface of the water. The Abraham et al. dispenser is not adapted for lowering below the surface of the water, for dispensing "chum" at some location below the surface and near the baited hook or lure, as provided by the present submersible bait dispenser. Moreover, the Abraham et al. dispenser cannot be selectively and remotely actuated by a line to dispense bait or "chum" selectively as desired, as provided by the present bait dispenser.

U.S. Pat. No. D-244,372 issued on May 17, 1977 to Jerry W. Kirkhart, titled "Fish Bait Dispenser," illustrates a design for a container generally resembling a coffee mug or the like, but including an upper closed lid and a lower dispenser outlet. No means is apparent in the Kirkhart disclosure for lowering the device of the Kirkhart design to a predetermined location beneath the surface of the water and releasing bait therefrom, as provided by the present submersible bait dispenser.

Finally, French Patent Publication No. 1,488,709 published on Jul. 13, 1967 to Michel Benezet illustrates an apparatus for automatically releasing bait or chum below the surface of the water, at periodic intervals. One embodiment of the apparatus comprises a series of adjacent bait compartments, with each two compartments in the series having a common wall therebetween. Each wall is apparently adapted to dissolve upon contact with water to release the contents of the associated compartment, whereupon water entering the compartment starts the process on the next wall of the next compartment. The process requires considerable time, on the order of twenty four hours per each compartment. Other embodiments illustrate mechanical means for opening the compartments in series. While the French apparatus is adapted for releasing material below the surface of the water, it cannot be selectively actuated by a line by an angler at the surface, as provided by the present submersible bait dispenser.

None of the above inventions and patents, either singly or in combination, is seen to describe the instant invention as claimed.

SUMMARY OF THE INVENTION

The present invention comprises a submersible bait dispenser providing for the release of "chum" for attracting fish, at some predetermined area or location beneath the surface of the water. The present bait dispenser may be lowered to substantially the same depth as the baited hook or lure being used by the angler, whereupon the angler may open the present dispenser to release the bait (minnows, etc.) contained therein. The proximity of the "chum" bait to the baited hook or lure, attracts fish to the vicinity of the lure rather than remaining on or near the surface, and drawing fish away from a submerged lure.

Accordingly, it is a principal object of the invention to provide an improved submersible bait dispenser for selectively dispensing "chum" bait below the surface of the water, as desired by the angler using the present device.

It is another object of the invention to provide an improved submersible bait dispenser which may be positioned at a predetermined depth as desired by the angler, in the vicinity of a baited hook or lure being used by the angler.

It is a further object of the invention to provide an improved submersible bait dispenser which may be remotely opened for release of bait therein, by means of the same line used for lowering the dispenser in the water.

An additional object of the invention is to provide an improved submersible bait dispenser which is adaptable for use in dispensing either live or killed bait, as desired.

Still another object of the invention is to provide an improved submersible bait dispenser including ballast means, and formed of corrosion resistant materials.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a submersible bait dispenser for selectively dispensing "chum," or free bait (i. e., bait which is not connected to a hook, lure, or line, but which is released freely in the water). Such "chum" is preferably dispensed in the immediate vicinity of a baited hook or lure, in order to attract fish to that vicinity. The present dispenser responds to this need by sinking to a predetermined depth (or to the bottom) as determined by an angler lowering the device into the water on a line, with the angler then remotely releasing the "chum" (live minnows, cut bait, etc.) from the dispenser as desired.

Figure 1:
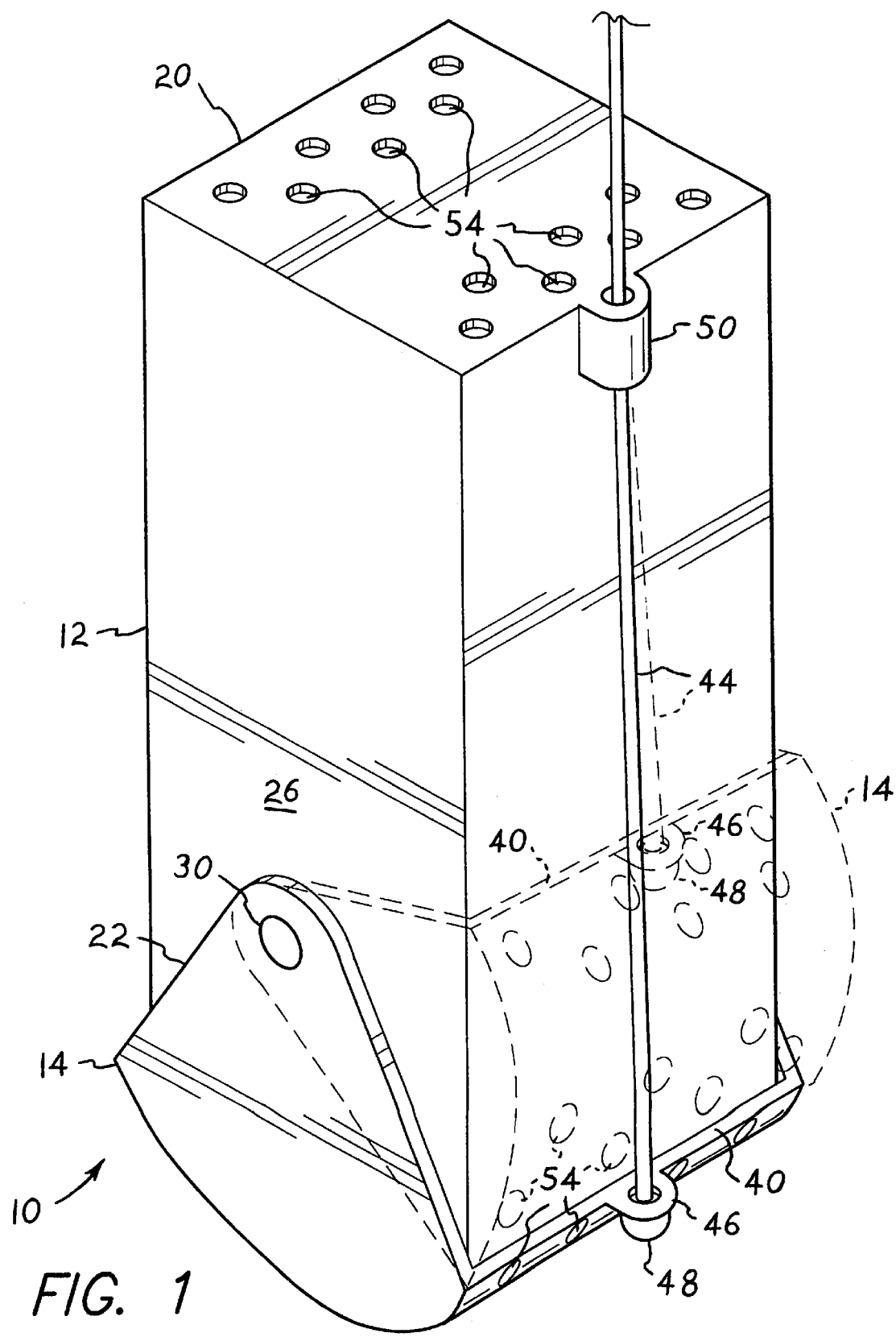
FIG. 1 is a perspective view of the present submersible bait dispenser, showing its various features and release operation.
Figure 2:
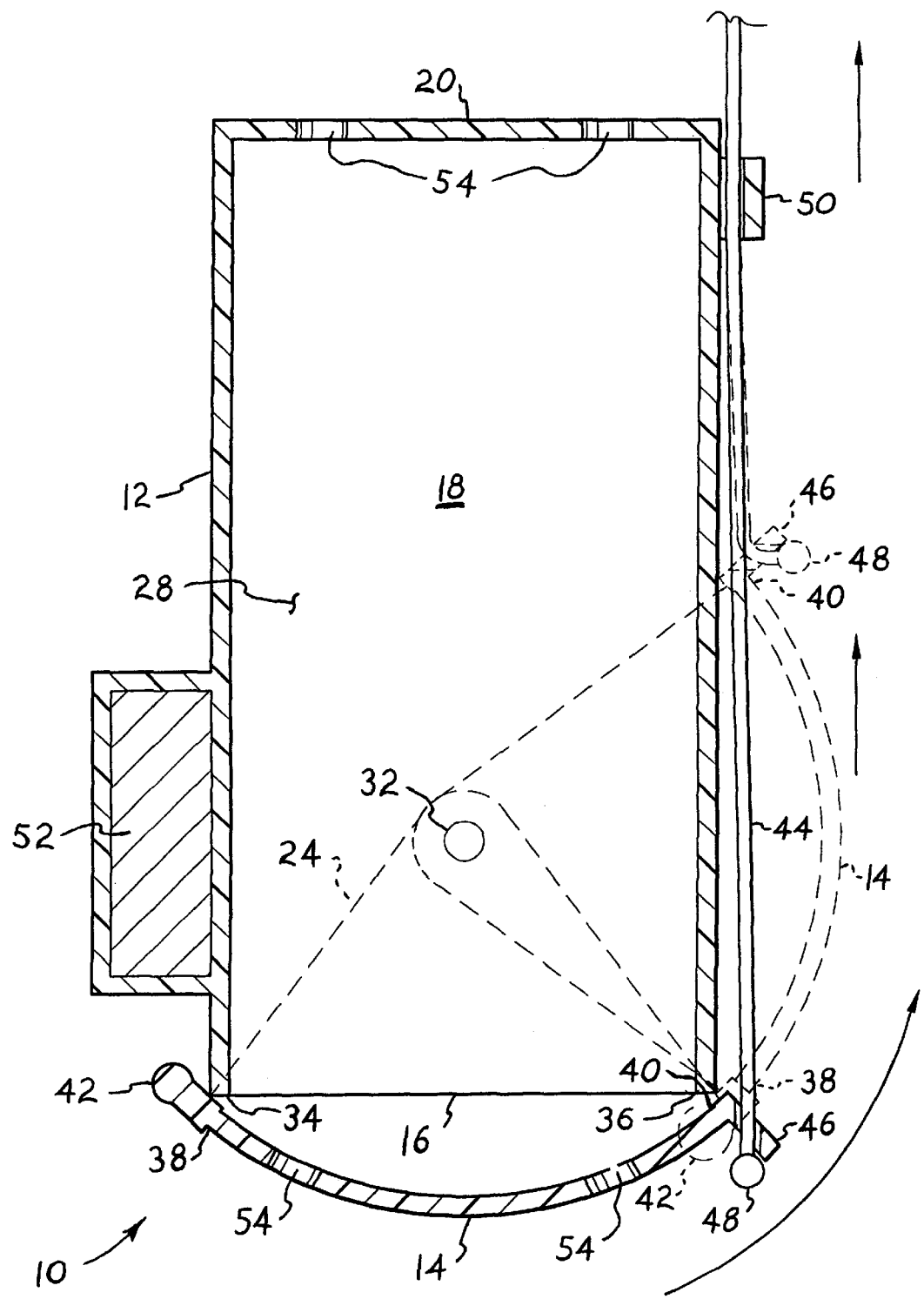
FIG. 2 is a side elevation view in section of the present submersible bait dispenser, showing further features thereof.

FIG. 1 provides a perspective view of the present bait dispenser, designated by the reference numeral 10 throughout the drawings. The present submersible dispenser 10 essentially comprises a container 12 having a selectively openable panel or door 14 disposed at one end thereof. The panel 14 serves to selectively cover or close an opening 16 in the container 12, or to provide access to the hollow interior 18 of the container 12, as shown in FIG. 2 of the drawings. The submersible dispenser 10 illustrated in the drawings is generally rectangular, having a fixed end panel 20 opposite the opening 16, with the openable panel 14 being selectively closable to substantially close off the opening 16 for preventing the escape of any live bait which may be contained therein until the openable panel 14 is opened by the angler using the present dispenser 10. It will be seen that other shapes may be provided for the dispenser, as desired.

The openable panel 14 has a generally arcuate shape, with opposed first and second attachment flanges 22 and 24 being secured to respective opposite first and second walls 26 and 28 by pivots 30 and 32. (The first flange and wall 22 and 26 are shown clearly in FIG. 1 of the drawings, while the opposite second wall 28 is shown in FIG. 2, with the associated flange 24 being shown in broken lines in FIG. 2.) Thus, the door or panel 14 pivots about the two opposed pivots 30 and 32, with the outwardly convex arcuate curvature of the door or panel 14 providing clearance between the openable panel 14 and the second edge of the first and second edges 34 and 36 adjacent the open end 16 of the container 12, as shown in FIG. 2 of the drawings. The first and second edges 38 and 40 of the door or panel 14 rest against these two edges 34 and 36 of the opening 16 when the panel 14 is in its closed position, thus precluding the escape of any bait (live or otherwise) from the interior 18 of the container 12. (The panel 14 is also shown in its open position in broken lines in FIG. 2.)

The first edge 38 of the panel 14 includes a deformable catch 42 extending therefrom, which engages the first edge 34 of the container opening 16 to hold the panel 14 closed as desired. The catch 42 may be formed integrally with the panel 14 of flexible materials, e. g. plastic or the like, or a thin spring metal catch or latch of some sort as desired. The catch 42 does not securely grip the first edge 34 of opening 16, but provides only sufficient gripping power to hold the panel 14 closed until a relatively small opening force is applied to the panel 14 to spring the catch 42.

This opening force is applied by a remotely actuated flexible line 44 which attaches to the second edge 40 of the panel 14 by means of an eye 46 to which the line 44 is connected. The attachment end of the line 44 may have a swaged fitting 48 to preclude its pulling back through the eye 46, or may be tied or otherwise secured to the second edge 40 of the panel 14, as desired. The opposite end of the container 12 may include a line guide 50 thereon, for holding the position of the line 44 normal to the second edge 40 of the panel 14 to assure that a tug on the line 44 produces an opening force generally at right angles to the pivot axis for the openable panel 14.

The line 44 also serves to lower the present submersible bait dispenser 10 into the water, and to retrieve it from the water. The bait dispenser 10 has only a slight negative static buoyancy, and will generally require some form of ballast means (e. g., a ballast weight 52 molded into or otherwise attached to the structure, for structures of light weight plastic materials). Thus, the bait dispenser 10 produces very little pull on the line 44, as most of the weight of the dispenser 10 is supported by the water which it displaces. Accordingly, the weight of the dispenser 10 in the water, is insufficient to cause the line 44 to exert sufficient force to pull the catch 42 loose and open the panel 14. However, once the bait dispenser 10 has been lowered to the desired level in the water, a sharp tug on the flexible line 44 provides sufficient force to pull the catch 42 loose, thereby opening the door or panel 14 to release the "chum" bait within the container 12.

Figure 3:
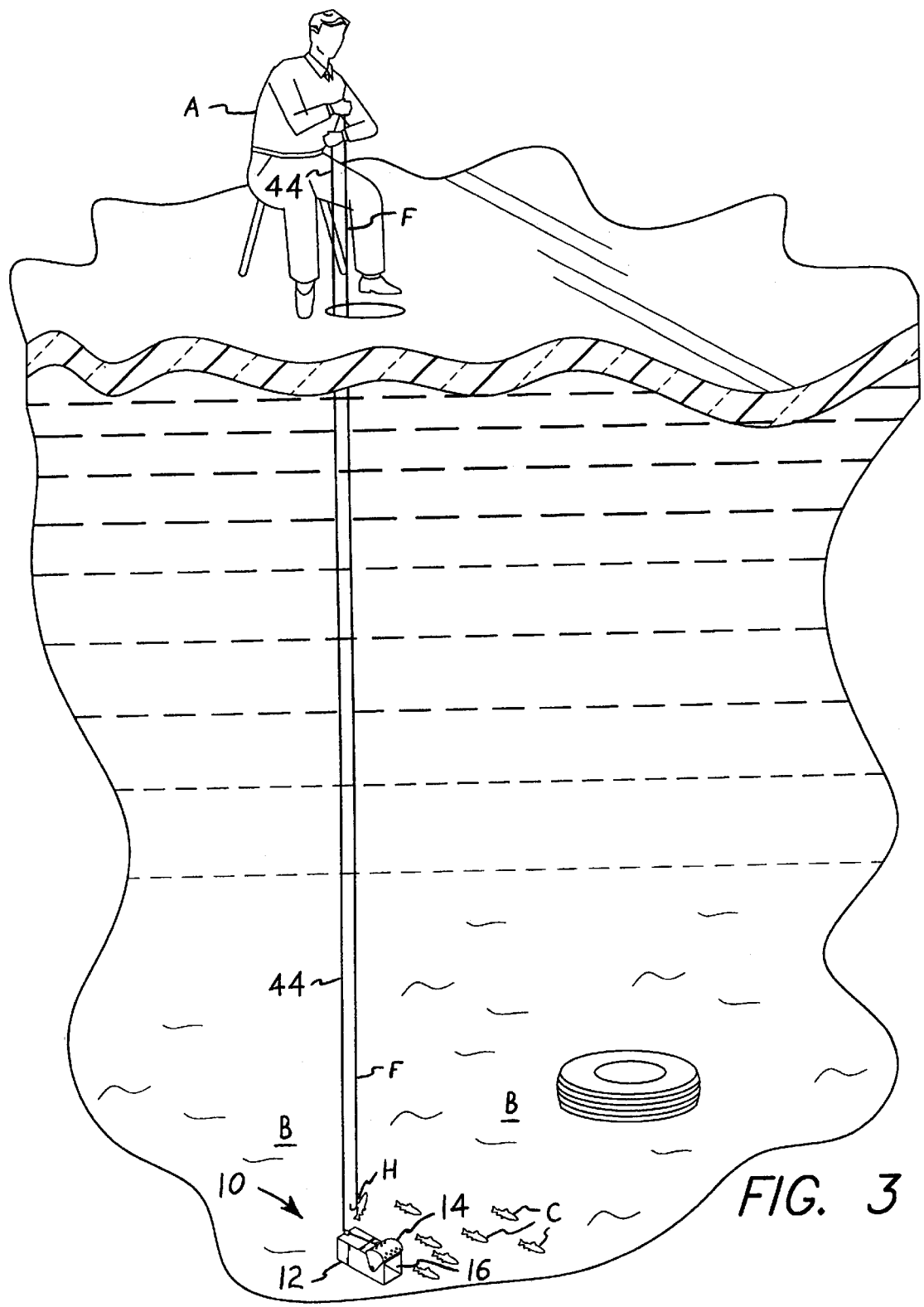
FIG. 3 is an environmental perspective view, showing the operation of the present submersible bait dispenser in use by an angler.

FIG. 3 illustrates the use of the present submersible bait dispenser 10. In FIG. 3, an angler A (illustrated as an ice fisherman, but it will be seen that the present invention may be used from a boat, pier, or anywhere there is a sufficient depth of water) has lowered a baited hook H on a fishing line F, near the bottom B of the body of water (lake, etc.). The angler A has also lowered the present bait dispenser 10 to rest on the bottom B using the flexible remote line 44. Once the bait dispenser 10 reaches the bottom B, the angler A need only give a short, sharp tug to the remote line 44 to pop the catch 42 loose from the first edge 34 of the opening 16 (as shown in FIG. 2), thereby releasing the "chum" or freely swimming bait fish C to attract larger fish, as shown generally in FIG. 3. Once the "chum" C have been released, the dispenser 10 may be raised from the water by means of the line 44 for refilling with additional "chum" if so desired, or for storage.

In summary, the present submersible bait dispenser provides a much needed means of distributing "chum," or free bait, to the area of the water in which the baited hook or lure is deployed by the angler. While the present bait dispenser is illustrated as being used on the bottom of a body of water, it will be seen that the alert angler will be aware of at least the general amount of fishing line deployed, and therefore the approximate depth of the baited hook or lure at the end of that line. Accordingly, the angler need only lower the present bait dispenser to that depth and open the panel or door as described above, to release the "chum" in the vicinity of the baited hook or lure.

The present submersible bait dispenser 10 may be used for remotely and freely dispensing virtually any form of bait which might be used as "chum," including live minnows and the like, and/or pieces of bait, as desired. Preferably, the present bait dispenser 10 is provided with a series of water flow holes 54 formed through at least the fixed end panel 20 and the opposite openable door or panel 14, to provide oxygenated water for any live bait which might be contained therein. (Additional flow passages may be provided in other panels, as desired.) The flow holes or passages 54 also serve to disseminate the scent of any live or other bait contained therein, to attract game fish as the device is lowered through the water, before releasing the "chum" contained therein.

Preferably, the various components of the present submersible bait dispenser are formed of non-corrosive materials (plastic, etc.). The use of a flexible plastic provides an additional advantage in that it provides for the catch 42 of the openable panel 14 to be formed integrally with the panel 14, as noted further above, thus simplifying the manufacturing process. However, the present submersible bait dispenser may be formed of other materials (e. g., metals such as stainless steel, aluminum, etc., or non-metallic materials) as desired.

The present submersible bait dispenser is particularly well suited for the amateur or casual hobbyist sport angler, who is generally fishing with only a single line and who seeks to catch only a relatively few game fish during a given fishing period. Such game fish are generally not very large, ranging up to several pounds, or perhaps more in some certain species such as sturgeon.

Accordingly, the present submersible bait dispenser need not be particularly large. Exemplary dimensions may be a length of about four inches (from the openable panel 14 to the opposite fixed end panel 20) and a width of about one and one half inches (across one of the walls 26 or 28, or across one of the opening edges 34 or 36). The relatively small interior volume 18 will provide for temporarily holding a few minnows or the like, which is sufficient for "chumming" for game fish in a localized area. It will be seen that the present submersible bait dispenser may be scaled upwardly or enlarged, or even reduced in size, if so desired, depending upon the specific application. Accordingly, the present submersible bait dispenser will provide a much needed means for distributing "chum" bait to the specific area where it is needed in the immediate vicinity of a baited hook or lure, which function will be most appreciated by virtually all anglers.

It is to be understood that the present invention is not limited to the sole embodiment described above, but encompasses any and all embodiments within the scope of the following claims.

I claim:

1. A submersible bait dispenser for selectively dispensing fishing bait below the surface of a body of water, comprising:

a bait container having a hollow interior;

said bait container including at least a first and an opposite second wall, and an opening selectively closed by a selectively openable panel for accessing said interior of said container, said openable panel being generally arcuate in section and includes opposite first and second attachment flanges secured respectively to said first and second wall by pivot means, with said arcuate panel being selectively arcuately movable about said pivot means for selectively closing said opening of said container and opening said container as desired;

means for remotely selectively opening said openable panel by an angler as desired; and means for selectively lowering and raising said container to and from the water by an angler as desired.

2. The submersible bait dispenser according to claim 1, wherein said means for remotely selectively opening said openable panel and said means for selectively lowering and raising said container to and from the water, comprise a single line connected to said openable panel.

3. The submersible bait dispenser according to claim 1, wherein said container is generally rectangular and includes a fixed end panel with said openable panel being disposed opposite said fixed end panel.

4. The submersible bait dispenser according to claim 1, wherein said opening of said container includes at least a first edge and said openable panel includes a first closure edge having a deformable catch disposed thereon, with said catch selectively engaging said first edge of said opening of said container for securing said selectively openable panel closed as desired.

5. The submersible bait dispenser according to claim 1, including line guide means disposed generally opposite said opening of said container.

6. The submersible bait dispenser according to claim 1, including ballast means for sinking said container as desired.

7. The submersible bait dispenser according to claim 1 wherein said container includes at least a fixed end opposite said selectively openable panel, with at least said fixed end and said openable panel each including a plurality of water flow passages therethrough.

8. The submersible bait dispenser according to claim 1, wherein at least said container and said selectively openable panel are formed of non-corrosive materials.

9. The submersible bait dispenser according to claim 1, wherein said container has a length of about four inches and a width of about one and one half inches.

10. A submersible bait dispenser for selectively dispensing fishing bait below the surface of a body of water, comprising:

a bait container having a hollow interior;

said bait container including at least a first and an opposite second wall, and an open portion selectively closed by a selectively openable panel for accessing said interior of said container, said openable panel being generally arcuate in section and includes opposite first and second attachment flanges secured respectively to said first and second wall by pivot means, with said arcuate panel being selectively arcuately movable about said pivot means for selectively closing said opening of said container and opening said container as desired; and a single line connected to said selectively openable panel for remotely and selectively opening said panel as desired, and for selectively lowering and raising said container to and from the water by an angler as desired.

11. The submersible bait dispenser according to claim 10, wherein said container is generally rectangular and includes a fixed end panel with said openable panel being disposed opposite said fixed end panel.

12. The submersible bait dispenser according to claim 10, wherein said opening of said container includes at least a first edge and said openable panel includes a first closure edge having a deformable catch disposed thereon, with said catch selectively engaging said first edge of said opening of said container for securing said selectively openable panel closed as desired.

13. The submersible bait dispenser according to claim 10, including line guide means disposed generally opposite said opening of said container.

14. The submersible bait dispenser according to claim 10, including ballast means for sinking said container as desired.

15. The submersible bait dispenser according to claim 10 wherein said container includes at least a fixed end opposite said selectively openable panel, with at least said fixed end and said openable panel each including a plurality of water flow passages therethrough.

16. The submersible bait dispenser according to claim 10, wherein at least said container and said selectively openable panel are formed of non-corrosive materials.

17. The submersible bait dispenser according to claim 10, wherein at least said container and said selectively openable panel are formed of plastic.

18. The submersible bait dispenser according to claim 10, wherein said container has a length of about four inches and a width of about one and one half inches.

* * * * *